United States Patent [19]

Engle

[11] 4,260,918
[45] Apr. 7, 1981

[54] EXPLOSION PROOF SUBMERSIBLE GEARMOTOR

[75] Inventor: William B. Engle, Columbus, Ind.

[73] Assignee: Reliance Electric Company, Columbus, Ind.

[21] Appl. No.: 970,813

[22] Filed: Dec. 18, 1978

[51] Int. Cl.³ .............................................. H02K 5/10
[52] U.S. Cl. ..................................... 310/87; 310/68 B; 310/88
[58] Field of Search ...................... 310/68 B, 68 C, 87, 310/83, 88

[56] References Cited

U.S. PATENT DOCUMENTS

| | | | |
|---|---|---|---|
| 2,725,824 | 12/1955 | Arutunoff | 310/88 X |
| 2,972,708 | 2/1961 | Schaefer | 310/68 B |
| 3,116,432 | 12/1963 | Ekey | 310/88 X |
| 3,447,000 | 5/1969 | Dugan et al. | 310/88 X |
| 3,746,472 | 7/1973 | Rupp | 310/87 X |
| 3,854,064 | 12/1974 | Dunbar | 310/87 |
| 3,947,709 | 3/1976 | Waltman | 310/87 |
| 4,040,773 | 8/1977 | Tuzson | 310/87 X |

Primary Examiner—Donovan F. Duggan
Attorney, Agent, or Firm—Marmaduke A. Hobbs

[57] ABSTRACT

An explosion proof submersible gearmotor in which a gear reducer has a housing with a sealed chamber and input and output shafts with a gear train connecting the input and output shafts, and in which a sealed motor is mounted on the gear reducer housing and a wall of the gear reducer forms one end wall of the motor, the shaft of the motor being directly connected to the input shaft of the gear reducer. The chamber in the gear reducer contains a non-conducting lubricant, and a moisture-sensing probe extends in the lubricant in the chamber for sensing the presence of water and transmitting a signal in response thereto, indicating a failure in one or more seals of the gear reducer. The operation of the motor of the gear reducer is then either automatically or manually interrupted until the unit has been serviced and repaired.

11 Claims, 5 Drawing Figures

EXPLOSION PROOF SUBMERSIBLE GEARMOTOR

EXPLOSION PROOF SUBMERSIBLE GEARMOTOR

Explosion proof motors with gear reducers are required for a variety of different applications where the environment may contain explosive or inflammable gases or liquids. An example of this type of application is in sewage treatment plants and industrial waste processing facilities wherein comminutors are used to pulverize incoming solid materials and thereby to reduce the wear on downstream equipment, such as pumps, which handle the material. Since these installations are subject to frequent flooding with water and inflammable liquids, and often contain an explosive atmosphere, extra precautions are required in the electrical equipment to avoid igniting the inflammable liquids and gases. In the past, these precautions have been met in some installations by driving the comminutors with standard drip-proof motors with waterproof reducers, which must be stopped after being submerged, and rebuilt before they can be placed in operation again. In other installations, hydraulic type drives or extended shafts are used to drive the submerged equipment. These prior types of drive systems have generally been unsatisfactory and/or unsafe, and have often resulted in extended periods of down-time while the power drives were being repaired or replaced. It is therefore one of the principal objects of the present invention to provide a drive consisting of a unitary motor and gear reducer, commonly referred to in the trade as gearmotors, which will operate safely in explosive atmospheres and inflammable conditions, and which can be installed in close proximity to the driven equipment, such as a comminutor, and will operate effectively in either a submerged or nonsubmerged condition.

Another object of the present invention is to provide a gearmotor which will give the required torque multiplication and motor speed reduction in applications where an explosive environment may exist, and which can operate effectively and reliably for extended periods of time, either submerged in water, or in air, without a supplemental cooling system.

Since most mechanical equipment, especially that which operates under adverse conditions, will eventually fail or will become unsafe, still another object of the invention is to provide a means in a submersible gearmotor unit which will sense the presence of water in the unit, and send a signal either to an operator or to a control system which interrupts the electrical power to the motor, and which can easily be serviced and readily repaired if required.

A further object is to provide a gearmotor of the aforesaid type which is compact in construction and design and simple in operation, and which is particularly adapted for direct mounting on equipment operating in potentially explosive atmospheres.

Additional objects and advantages of the present invention will become apparent from the following description and accompanying drawings, wherein.

Figure 1:
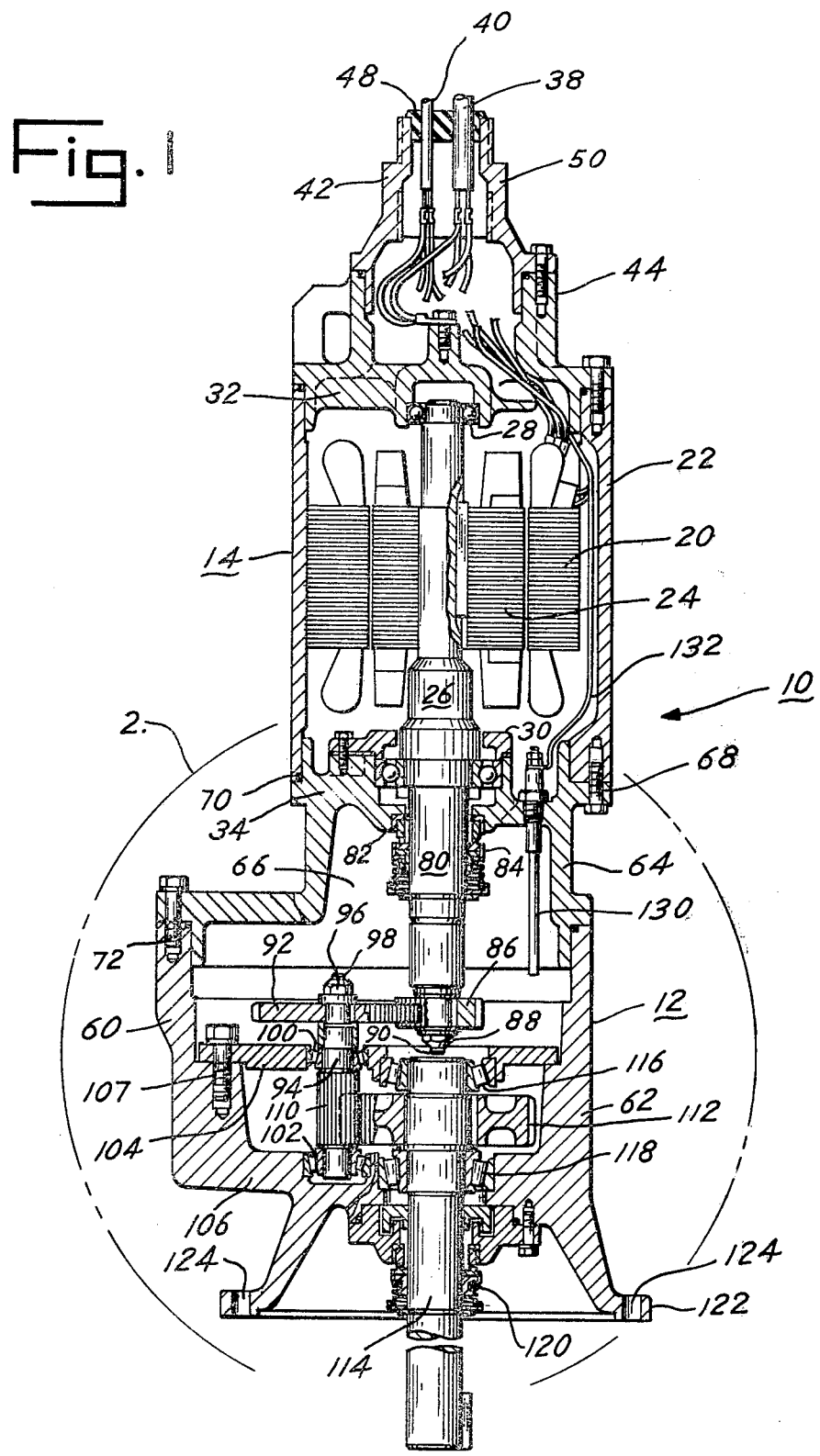
FIG. 1 is a vertical cross sectional view of the present explosion proof, submersible gearmotor, showing one embodiment of the invention.

Referring more specifically to the drawings, and to FIG. 1 in particular, numeral 10 indicates the present explosion proof submersible gearmotor, consisting generally of a gear reducer 12 and an electric motor 14 mounted rigidly on the gear reducer so that the two form an integral unit capable of operating submerged in water or other liquids, or used in various types of atmosphere without danger of explosions and fire. While the motor is designed for submersion in liquid, and will operate for an indefinite period of time in a liquid such as water, it can be used equally as well under normal atmospheric conditions.

Basically, the motor illustrated in the drawings is of a conventional type having a stator 20 mounted in housing 22, and an armature 24 mounted on a shaft 26 which is journaled at its upper end in a bearing 28 and at its lower end in bearing 30, the bearing 28 being mounted in housing end wall 32 and bearing 30 being mounted in end wall 34. The motor is connected to a source of electrical power by lead 38 and to a control circuit by a lead 40, the two leads extending through a water and moisture proof connector 42 mounted on an extension 44 of housing end wall 32. The power and control leads are sealed by a gasket 48 and epoxy compound 50 so that liquids and gases cannot enter the motor housing through the connector.

The gear reducer 12 includes a housing 60 which consists of a lower portion 62 and an upper portion 64, the latter portion being formed integrally with wall 34, which separates the chamber 66 of the gear reducer from the electric motor. The wall 34 is joined rigidly to the bottom of motor housing 22 by a plurality of bolts 68, and is sealed to prevent the entrance of liquid or gases into the motor by an O-ring 70 extending around the inner periphery of the motor housing and the outer periphery of wall 34, and the two portions of the gear reducer are sealed by O-ring 72. Gear reducer shaft 80 extends through an opening 82 in wall 34 and is splined to motor shaft 26 so that the two shafts rotate in unison in bearing 30. Chamber 66 is filled with a lubricant, and the chamber is sealed from the motor by a seal 84, the seal being of a well known construction, and various types of seals capable of effectively preventing the fluid in chamber 66 from seeping or otherwise flowing from the chamber into the motor housing may be used in place of the one shown. Since various types of satisfactory seals can be used, the particular one shown in the drawing will not be described in detail herein.

Shaft 80 is the power input shaft for gear reducer 12, and a pinion 86 is mounted on the end of the shaft by a nut 88 threaded onto a screw-threaded extension 90 of the shaft. Pinion 86 meshes with gear 92, which is mounted on counter-shaft 94 and held securely thereon by a nut 96 threaded onto an extension 98 of the counter-shaft. The counter-shaft is journaled in bearings 100 and 102, the former bearing being mounted in a plate 104 and the latter being mounted in end wall 106 of housing 60, plate 104 being rigidly secured to the internal wall of the housing by a plurality of screws 107. Mounted on or forming an integral part of shaft 94 is a pinion 110 which meshes with a gear 112 mounted on output shaft 114 of the gear reducer. The output shaft is journaled in bearings 116 and 118 in plate 104 and end wall 106, respectively, and extends outwardly through the end wall, and is effectively sealed by a seal 120 similar in construction to seal 84 previously referred to herein. The output shaft is connected to a comminutor or other driven equipment, and the gear reducer housing is provided with a flange 122 for connection to the driven equipment by bolts extending through holes 124.

The chamber 66 is filled with an electrically non-conducting lubricant which provides permanent lubrication for the moving parts of the gear reducer. In the event a leak should develop so that water enters the chamber, a moisture-sensing probe 130 warns of the seepage of the moisture into the chamber. The probe is mounted in wall 34 and extends into chamber 66, and is connected by lead 132 through connector 50 to a control system which shuts off the supply of power and thereby interrupts the operation of the motor until the gear-motor unit has been repaired and the moisture removed from chamber 66.

In the operation of the gearmotor unit just described, with the unit mounted or otherwise connected to a comminutor or other piece of equipment submerged in water or other liquid, the motor is energized, thereby driving gear reducer input shaft 80, which in turn drives pinion 86 and gear 92 on counter-shaft 94. The pinion 110 on the counter-shaft drives gear 112 and output shaft 114, which in turn drives the comminutor or other equipment. In the event moisture enters chamber 66 through the joint between lower portion 62 and upper portion 64, or through or around seal 120, the moisture-sensing probe 130 either shuts down the equipment and/or warns an operator of a seal failure. In the normal operation of the gearmotor unit, the ambient condition is immaterial, since it is fully sealed and will operate equally effectively in liquid or moisture conditions and in gaseous atmosphere. Since it is permanently lubricated and fully enclosed, it can operate indefinitely in a submerged condition, or in other places where both safety and little attention are required for satisfactory performance.

Figure 2:
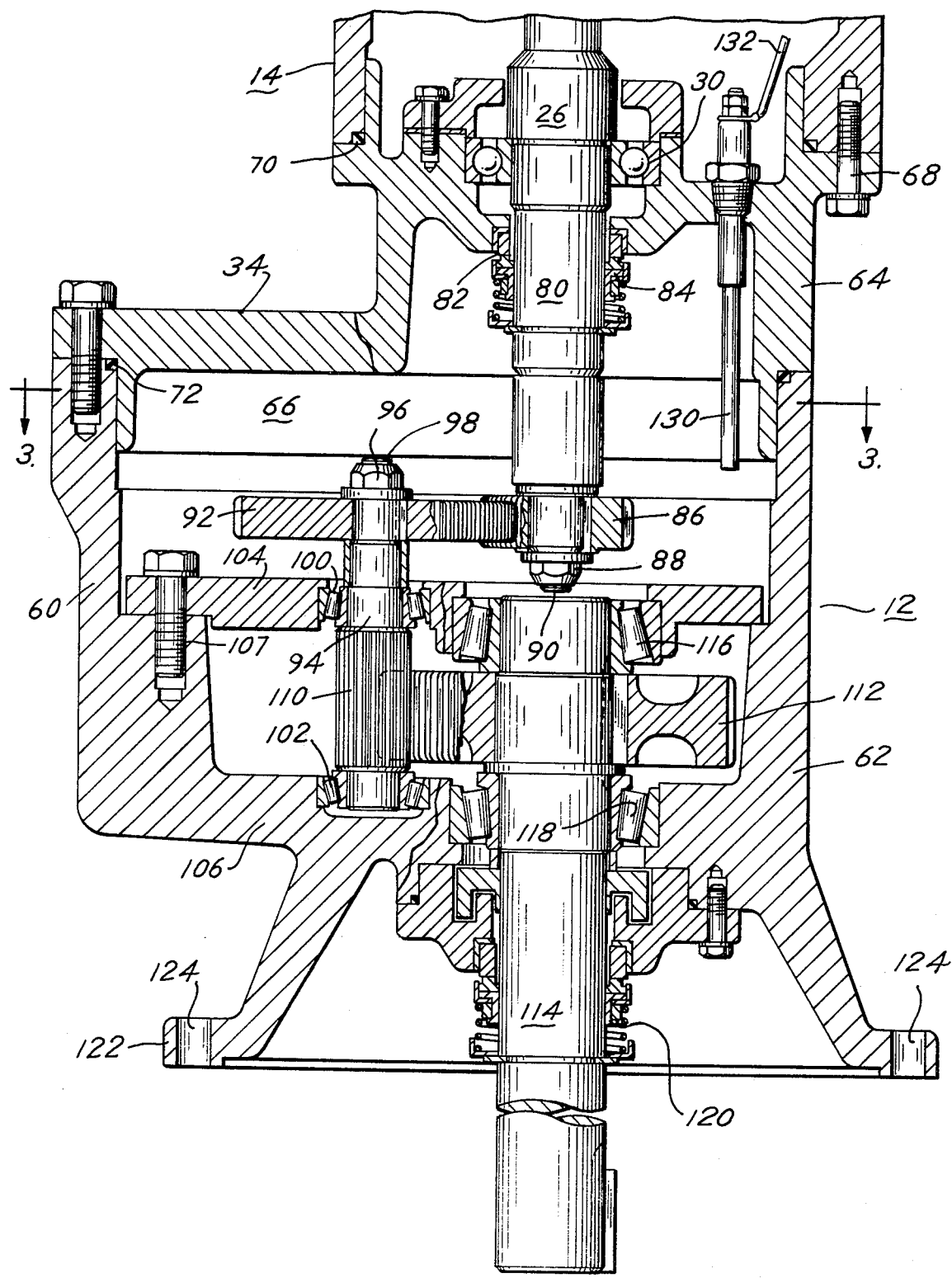
FIG. 2 is an enlarged vertical cross sectional view of the gear reducer shown in FIG. 1, the view being identified by circle 2 in the latter figure.
Figure 3:
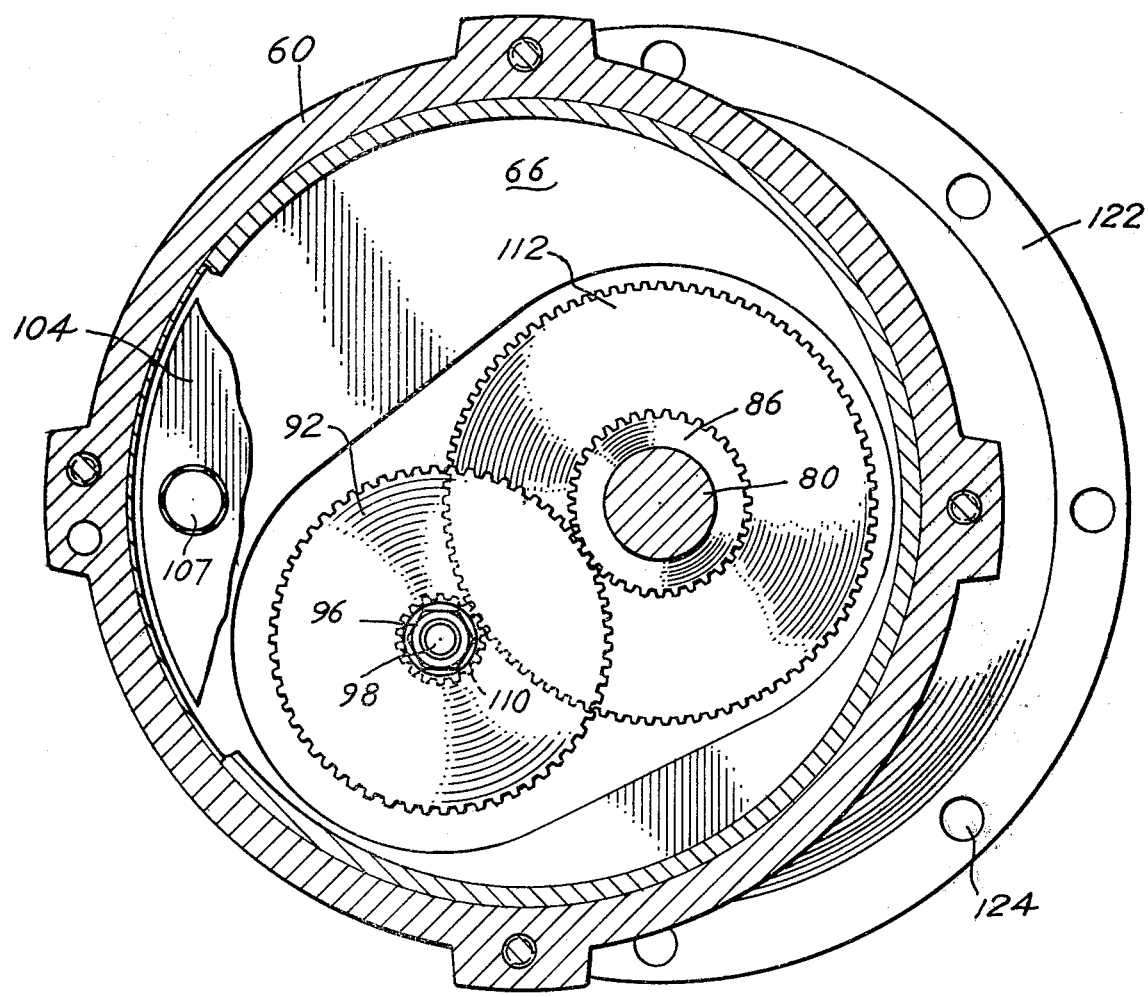
FIG. 3 is a horizontal cross sectional view of the gear reducer shown in FIGS. 1 and 2, the section being taken on line 3—3 of FIG. 2.
Figure 4:
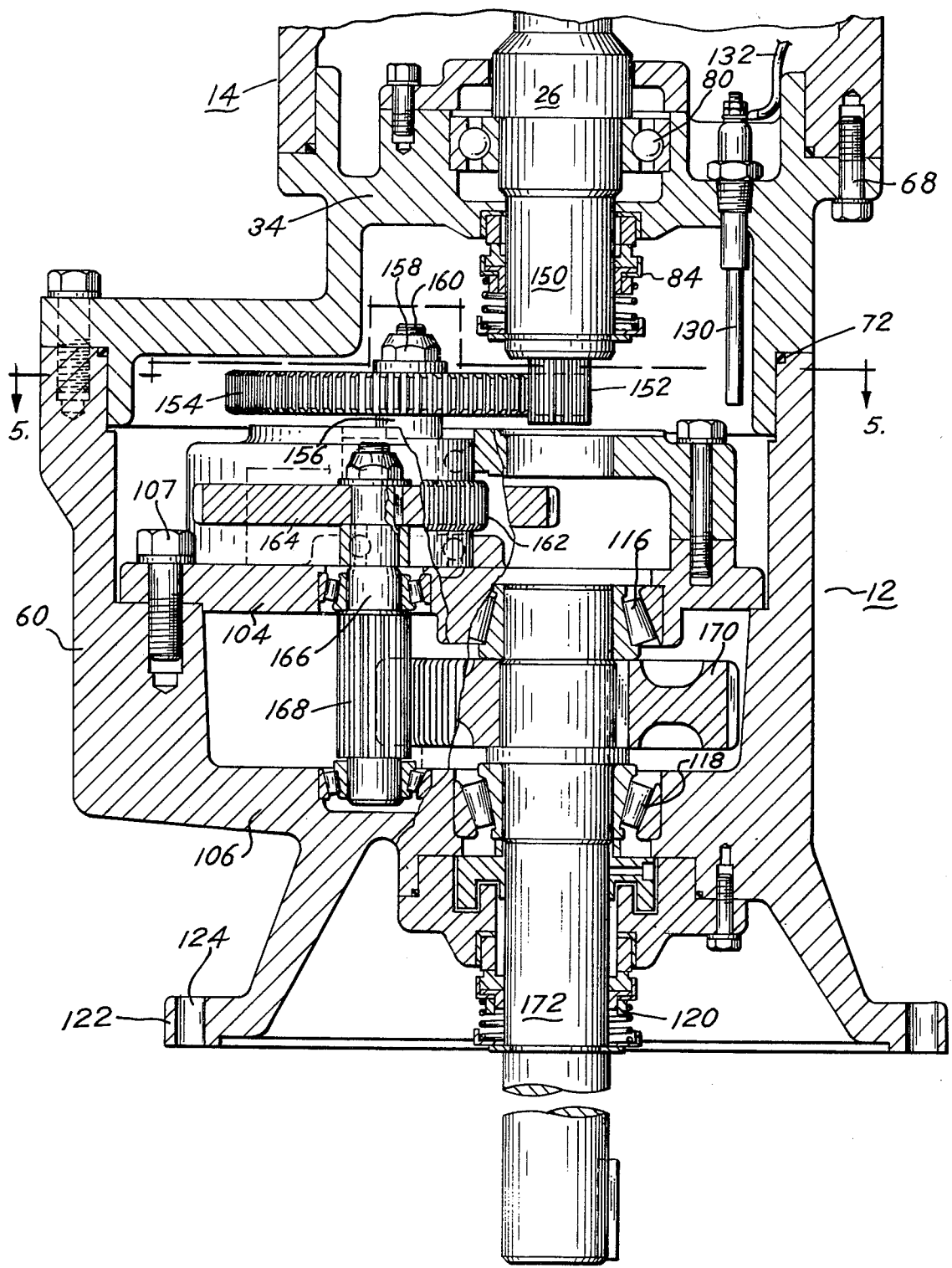
FIG. 4 is a vertical cross sectional view of a gearmotor, illustrating another embodiment of the gearmotor involved in the present invention.
Figure 5:
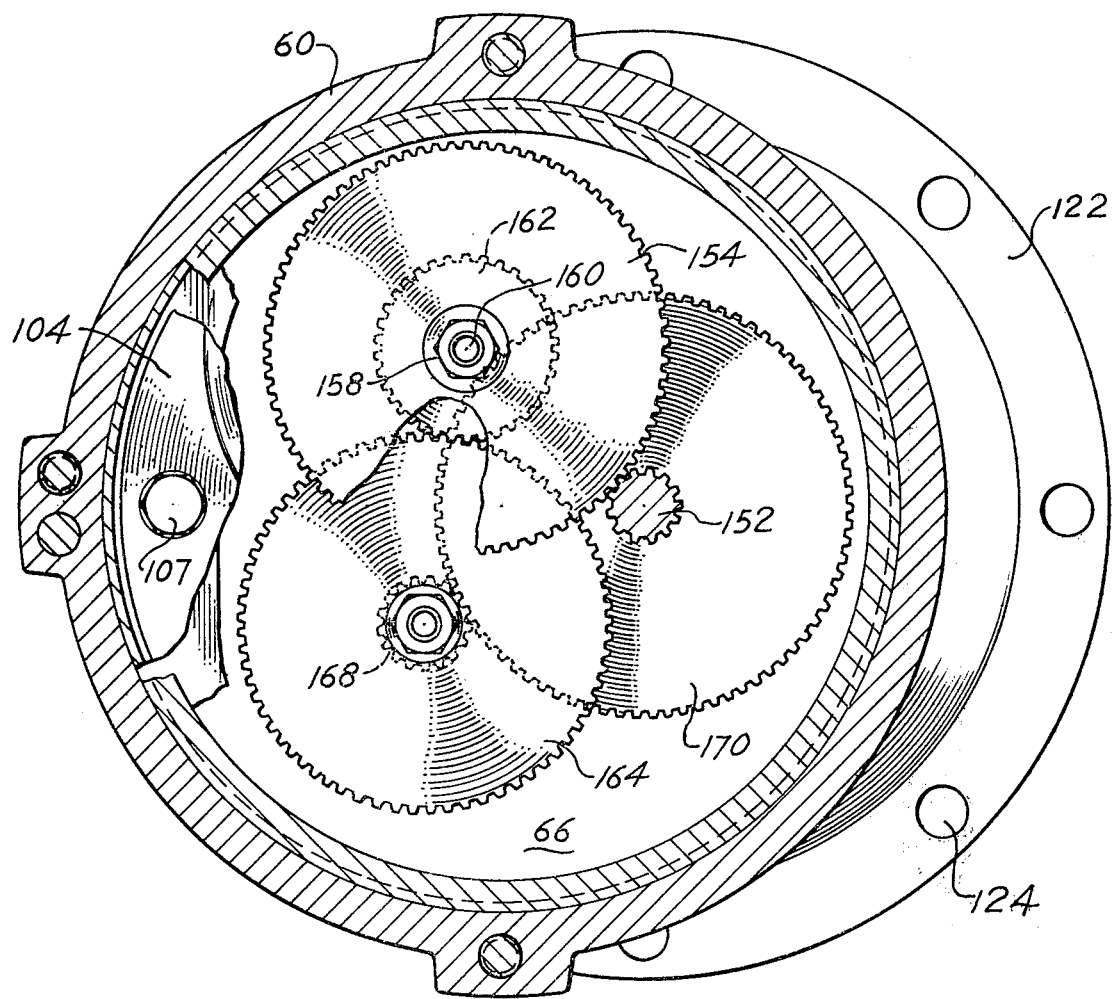
FIG. 5 is a horizontal cross sectional view of the gear reducer shown in FIG. 4, the section being taken on line 5—5 of the latter figure.

In the embodiment of the invention illustrated in FIGS. 4 and 5, there is a three-step gear reduction rather than the two-step as shown in FIGS. 1 and 2. The motor may be identical to the one shown in the preceding drawings, and the input shaft is essentially the same as that described. In this embodiment, an input shaft 150 is connected to motor shaft 26 by a spline, or it may be formed integrally with the motor shaft. The motor shaft is supported by bearing 30 in end wall 34, and shaft 150 is sealed by a seal 84 as previously described. The pinion 152 is mounted on the end of shaft 150 and meshes with gear 154 mounted on a first counter-shaft 156, and is secured thereon by a nut 158 threaded onto extension 160 of the shaft. Mounted on shaft 156 is a pinion 162 which meshes with gear 164 mounted on a second counter-shaft 166. A pinion 168 is mounted on the second counter-shaft and meshes with the final output gear 170 mounted on output shaft 172. The first and second counter-shafts are both journaled in plate 104 and in the lower end wall 106 of the housing in essentially the same manner as illustrated and described with reference to the first embodiment. Since most of the features not specifically described in this embodiment are essentially the same as those in the first embodiment, like numerals are used to refer to like parts and a detailed description of those parts will not be included.

In the operation of the second embodiment of the invention illustrated in FIGS. 4 and 5, the torque is transmitted from the input shaft 150 through the gears on the two counter-shafts to output shaft 172. The chamber 66 is sealed as previously described, and moisture-sensing probe 130 is included in this embodiment to provide a warning signal and/or to shut down the equipment in the event the seals fail and moisture enters chamber 66.

It is seen that both embodiments of the invention described herein provide a gearmotor capable of being effectively and safely used in adverse environments, such as in water or in an explosive atmosphere. Since the gear reducer and the motor are permanently lubricated, they can operate for indefinite periods of time without service, and in the event of failure of any of the seals, the supply of electrical current to the motor is interrupted and the equipment is stopped. Further, in the event the equipment is to be serviced, it can readily be disassembled to obtain access to the gear reducer parts and/or to the motor, so that repair costs and down-time are kept at a minimum.

While two embodiments of the present explosion proof submersible gearmotor have been described in detail herein, various changes and modifications may be made without departing from the scope of the invention.

I claim:

1. An explosion proof submersible gearmotor comprising a gear reducer having a housing with a sealed chamber therein, an input shaft, an output shaft, a reduction gear train in said chamber connecting said input shaft with said output shaft, a sealed electric motor having a housing mounted on said gear reducer housing in sealing relation therewith and having a shaft connected to said gear reducer input shaft, a wall separating said motor from said gear reducer and having an opening through which said input shaft extends, an electrical non-conducting lubricant in said chamber, and a moisture-sensing probe extending into the lubricant in said chamber for sensing the presence of water in said chamber and transmitting a signal in response thereto, indicating a failure in a seal of said gear reducer.

2. An explosion proof submersible gearmotor as defined in claim 1, in which said gear train includes a pinion on said input shaft, a gear on said output shaft, and a counter-shaft with a gear and pinion meshing with said first mentioned pinion and gear.

3. An explosion proof submersible gearmotor as defined in claim 1, in which said gear train includes a pinion on said input shaft, a gear on said output shaft, and two counter-shafts with a gear and pinion on each interconnecting said first mentioned gear and pinion.

4. An explosion proof submersible gearmotor as defined in claim 1, in which said moisture-sensing probe extends through said wall, and an electrical lead from said probe extends through said motor to a remote control for said motor.

5. An explosion proof submersible gearmotor as defined in claim 1 in which electrical lines to said motor and a lead to said moisture-sensing probe pass through an opening in the end of said motor opposite said wall and a sealing means seals said lines and lead in said end.

6. An explosion proof submersible gearmotor as defined in claim 4 in which electrical lines to said motor and the lead to said moisture-sensing probe pass through an opening in the end of said motor opposite said wall and a sealing means seals said lines and lead in said end.

7. An explosion proof submersible gearmotor as defined in claim 1 in which the housing for said gear reducer consists of two parts secured together in sealed relationship, and seals are provided around said input and output shafts.

8. An explosion proof submersible gearmotor as defined in claims 2 or 3 in which the housing for said gear reducer consists of two parts secured together in sealed relationship, and seals are provided around said input and output shafts.

9. An explosion proof submersible gearmotor as defined in claims 1 or 7 in which said wall forms an end wall of said motor, and the motor is secured thereto in sealing relationship to form an integral unit with said gear reducer.

10. An explosion proof submersible gearmotor as defined in claim 1 in which said wall forms the top of said gear housing and a base is provided on the lower part of said gear reducer housing for securing the gearmotor to equipment to be driven by the gearmotor.

11. An explosion proof submersible gearmotor as defined in claim 9 in which said wall forms the top of said gear housing and a base is provided on the lower part of said gear reducer housing for securing the gearmotor to equipment to be driven by the gearmotor.

* * * * *